(12) United States Patent
Cannon et al.

(10) Patent No.: US 7,230,769 B2
(45) Date of Patent: Jun. 12, 2007

(54) HUMIDITY TOLERANT SCAN LENS

(75) Inventors: Roger Steven Cannon, Lexington, KY (US); Dana Allen Dodds, Georgetown, KY (US); Philip Jerome Heink, Lexington, KY (US); Robert LeRoy Paterson, Nicholasville, KY (US); Daniel Eugene Pawley, Louisville, KY (US); Wilson Morgan Routt, Jr., Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 129 days.

(21) Appl. No.: 10/915,837

(22) Filed: Aug. 11, 2004

(65) Prior Publication Data

US 2005/0013010 A1 Jan. 20, 2005

(51) Int. Cl.
*G02B 26/08* (2006.01)
*G02B 3/02* (2006.01)
(52) U.S. Cl. ................ 359/642; 359/206; 359/662
(58) Field of Classification Search ................ 359/642, 359/662, 206
See application file for complete search history.

(56) References Cited

U.S. PATENT DOCUMENTS

| 4,523,801 | A | * | 6/1985 | Baba et al. ................. 359/218 |
| 6,807,011 | B2 | * | 10/2004 | Cannon et al. ............. 359/642 |
| 2003/0021307 | A1 | * | 1/2003 | Yamazaki .................... 372/24 |

FOREIGN PATENT DOCUMENTS

| JP | 01100510 A | * | 4/1989 |
| JP | 07325206 A | * | 12/1995 |

* cited by examiner

*Primary Examiner*—Scott J. Sugarman
(74) *Attorney, Agent, or Firm*—Coats & Bennett

(57) ABSTRACT

A lens has a lens body (1), reinforcing extensions (3a, 3b) and a clear aperture (9) surrounded on top and bottom by lens body. The lens is suitable for spot scanning. The lens is made of a water absorbing material, such as most polymers, particularly acrylate polymers. Aluminum sheets as vapor barriers are attached on each side of the lens body. This results in excellent resistance to change or distortion in high humidity environments.

16 Claims, 6 Drawing Sheets

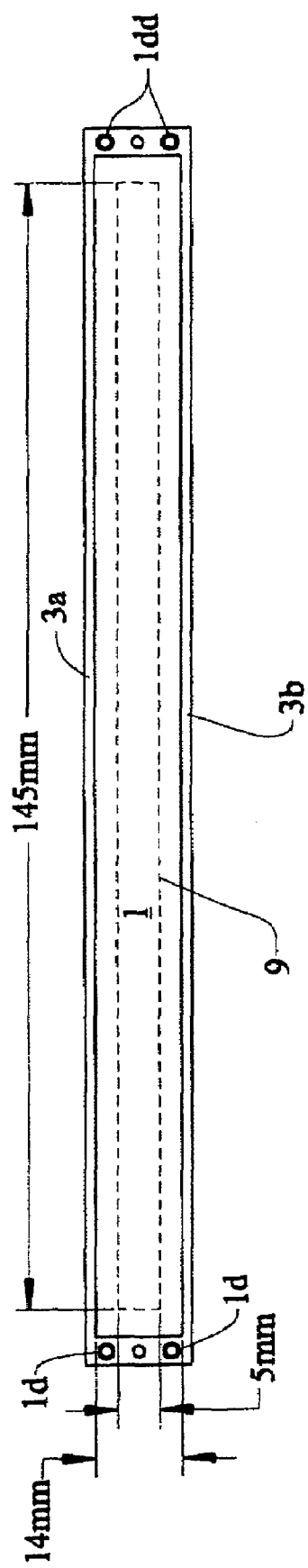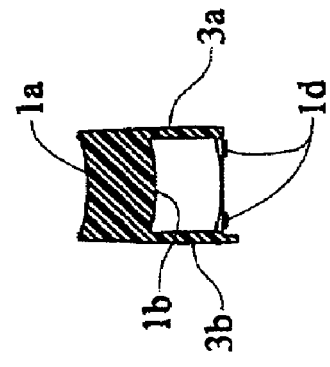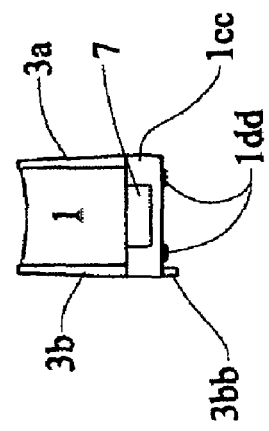

HUMIDITY TOLERANT SCAN LENS

CROSS REFERENCE TO RELATED APPLICATIONS

Pursuant to 37 C.F.R. § 1.78, this application is related to and claims the benefit of earlier filing date of application Ser. No. 10/346,203 filed Jan. 16, 2003 now U.S. Pat. No. 6,807,011 entitled "Humidity Tolerant Scan Lens."

TECHNICAL FIELD

This invention relates to lenses of configuration for light scanning through the lens, such as f-theta lens, the lenses being of material which changes or distorts the optical function with increases in humidity. This invention renders such lenses resistant to such changes or distortions.

BACKGROUND OF THE INVENTION

Materials forming lenses that change or distort with increases of humidity are typically plastics, especially acrylic plastics. Some hydrocarbon plastics resist water intake and are used in special situations for lenses, but the material are expensive and are difficult to mold to form the lens.

The prior art has addressed this problem in U.S. Pat. No. 5,409,360 to Nakanishi, but the solution presented in that patent is one which significantly restricts the characteristics and form of the lens since it is based on the premise that a lens fully permeated with water does not exhibit major distortion. Accordingly, the better lenses in accordance with this patent would be tall and thin.

Lenses of this invention may differ little from ordinary form for scan lenses, but have vapor barriers applied to render the lens highly resistant to increases in humidity.

DISCLOSURE OF THE INVENTION

A lens of this invention has a long dimension, an optical transmission dimension perpendicular to the long dimension, and a height dimension perpendicular to both the long dimension and the optical transmission dimension. The lens has a clear aperture along the long dimension of at lease 35 millimeters (mm), the clear aperture having a height that is less than 32 mm. The clear aperture is surrounded top and bottom by lens body having height on each side of at least 1.5 mm.

On the top and bottom of this lens is a layer of a vapor barrier, which may be a sheet of metal or other imperious material attached by adhesive. Such lenses are very stable optically with changes in humidity up to almost saturation humidity. Where a lens is thin in the light transmitting direction, the barrier might be omitted at such thin points, as the significant optical distortion does not occur where the lens is thin enough to become fully saturated.

BRIEF DESCRIPTION OF THE DRAWINGS

The details of this invention will be described in connection with the accompanying drawings, in which

FIG. 6 is a front view from the optical transmission path showing in dotted outline the clear aperture region before application of a vapor barrier;

FIG. 7 is a side view of FIG. 5 from the right side,

FIG. 8 is a sectioned view through the center of the lens, also of FIG. 5 from the right;

DESCRIPTION OF THE PREFERRED EMBODIMENTS

Figure 1:
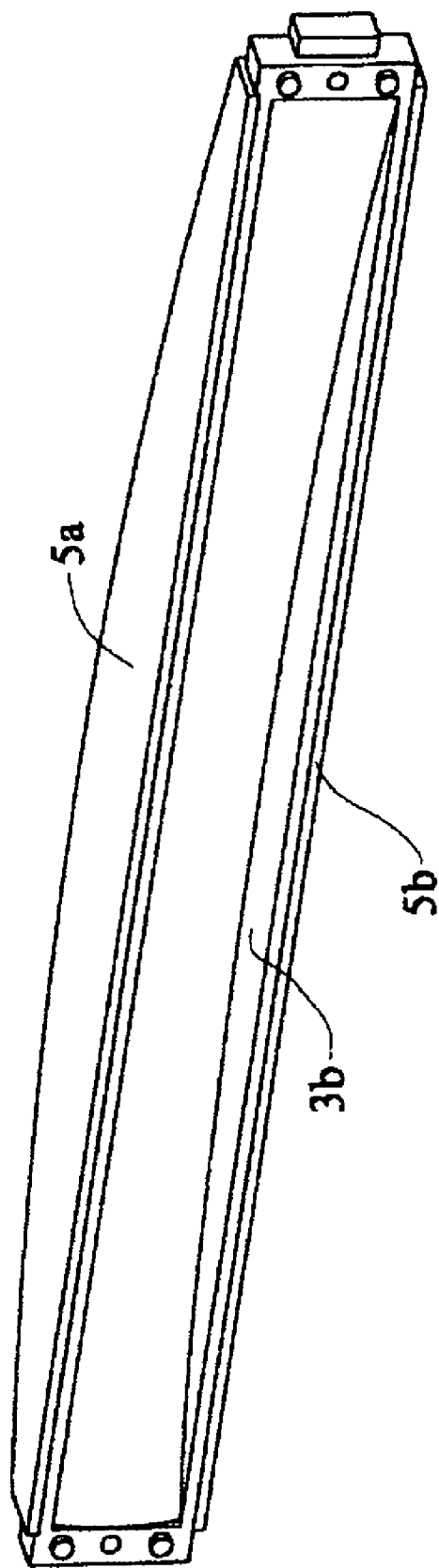
FIG. 1 is a perspective view showing the lens with vapor barrier.

The lens of this invention is shown illustratively in FIG. 1. It is characterized by being relatively long and narrow. It has an optical body 1 and planar extensions 3a (FIG. 2) and 3b, which provide added rigidity. Extensions 3a and 3b are molded integrally with optical body 1 for molding efficiency and for immediate, strong contact with body 1. The lens has a top barrier layer 5a and a bottom barrier layer 5b, attached by adhesive in this embodiment.

Figure 2:
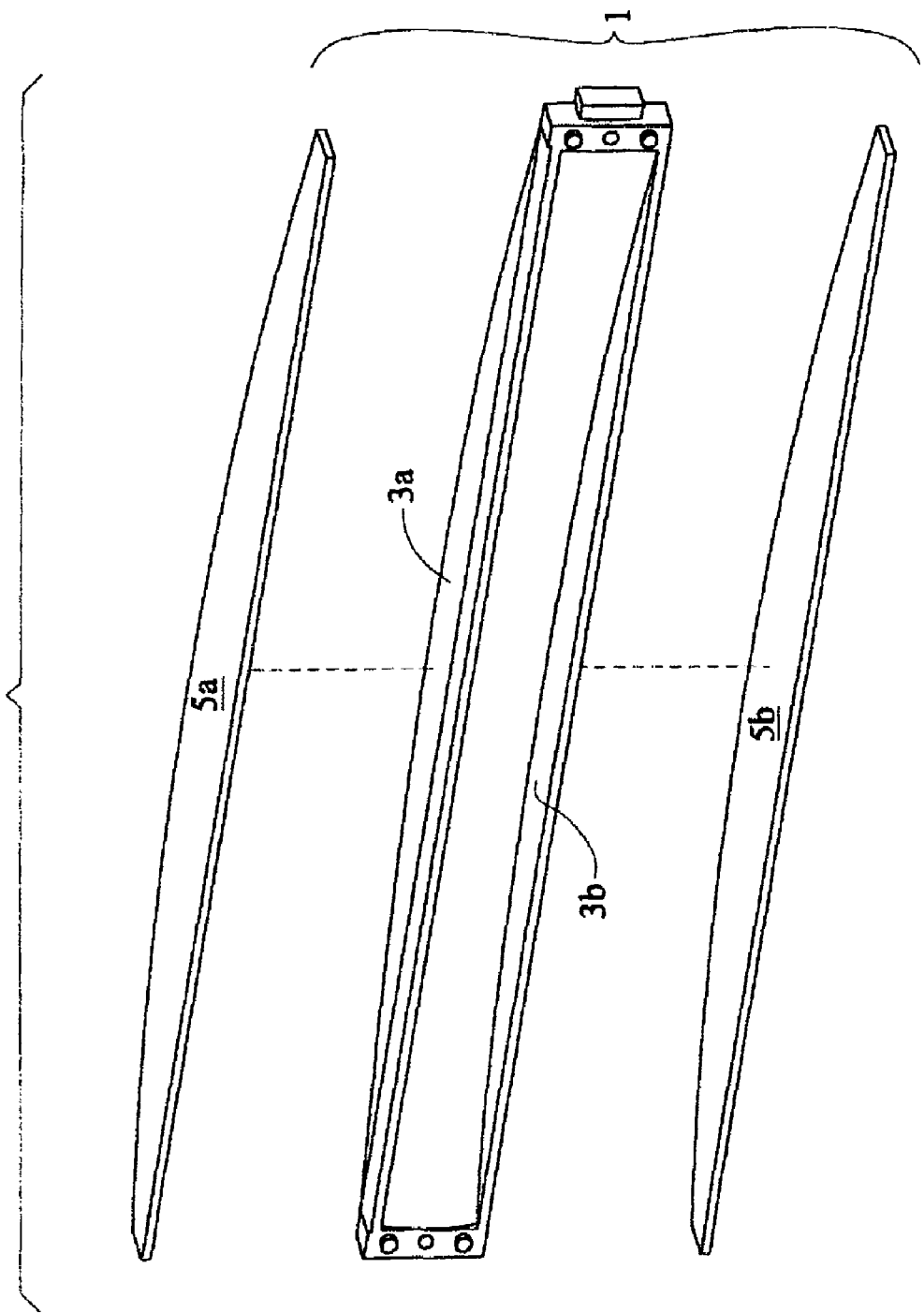
FIG. 2 is a is a second perspective view from a higher angle than FIG. 1 showing vapor barrier sheet spaced away for purposes of illustration, FIG. 3 a top view looking down on the light transmission plane showing a cross section of the lens through the clear aperture.

As illustrated in FIG. 2, barrier layers 5a and 5b are substantially coextensive with the surface of extensions 3a and 3b respectively, and extensions 3a and 3b have portions that cover optical body 1. Accordingly, the top and bottom surfaces in the height dimension of optical body 1 are covered by barrier layers 5a and 5b in the complete lens, such as shown in FIG. 1.

Figure 3:
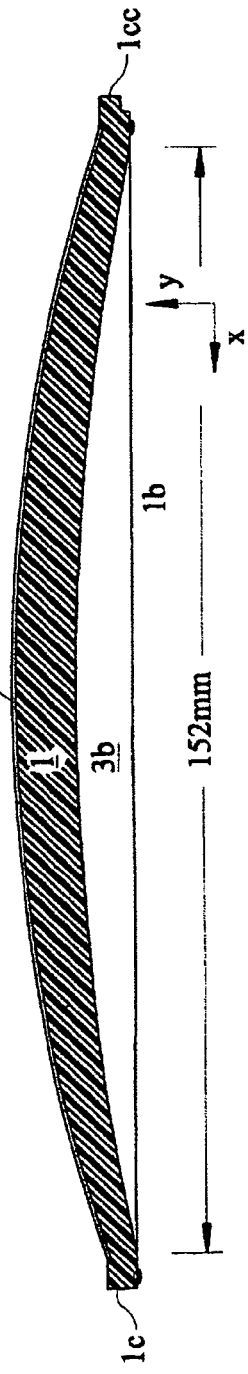

FIG. 3 illustrates, by cross section through the lens, the optical body 1 and the lower planar extension 3b. Although this invention is understood to be generally applicable to the type of lenses used for scanning, for purposes of this illustrative embodiment, the outer surface 1a of body 1 has a circular radius of 235 mm and the inner surface 1b of body 1 has a circular radius of 382 mm. With respect to FIG. 3 the length dimension of the lens is the horizontal dimension (the x direction in the insert), and the light transmission dimension is the vertical dimension (the y direction in the insert). The linear, horizontal dimension of the curved lens part is 152 mm.

Non-curved, rectangular end parts 1c and 1cc are for position referencing and other support of the lens.

The major dimensions of FIG. 3 are generally to scale. It is apparent that the optical body 1 is relatively thick throughout its length, although the thickness increases significantly between the middle and thinner ends. Such a lens has positive optical power. A diverging or negative lens would be thinner in the middle than at the ends. This invention applies to all scan lenses in general.

Figure 4:
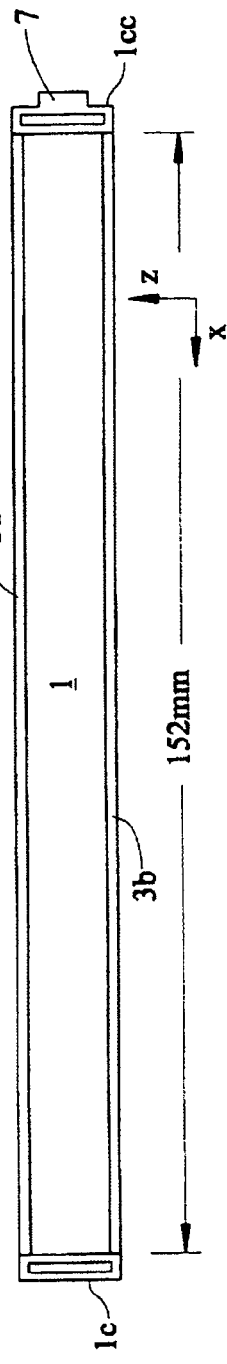
FIG. 4 is a side view from the optical transmission path before application of a vapor barrier.

FIG. 4 is a back, side view with respect to FIG. 3 but not sectioned and without the barrier layers. Supporting parts 1c and 1cc are rectangular and extend across the lens. Part of the outer surface of parts 1c and 1cc may be a reference or critical dimension from which other part of the lens are to be located. Such referencing is standard and therefore will not be further discussed.

Element 7 is a gate for injection molding. It may be removed from the final lens if desired.

The insert in FIG. 4 is to define the long dimension of the lens as x and the height dimension of the lens as z. The major dimensions of FIGS. 3 though 5 are generally to scale.

Figure 5:
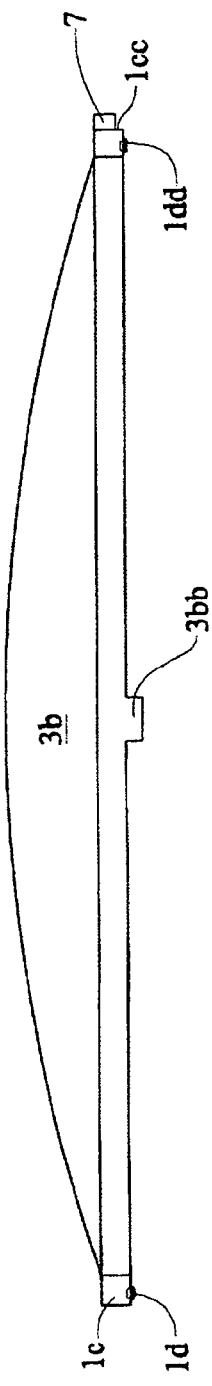
FIG. 5 is a bottom view looking up on the light transmission plane before application of a vapor barrier.

FIG. 5 is a bottom view with respect to FIG. 3. It illustrates bottom extension 3b as having a center, rectangular small locating extension 3bb for locating the lens during use. Extension 3bb is not shown in other views for purposes of clarity and because alternative elements to locate the lens are entirely consistent with this invention. Similarly, FIG. 5 shows small bumps 1d and 1dd on supporting parts 1c and 1cc respectively. These are alternative locating elements. Such locating elements are standard and therefore will not be further discussed.

FIG. 6 is a view toward the lens as light exits the lens. It is a front side view with respect to FIG. 3, but not sectioned and without the barrier layers. Two, spaced positioning bumps 1d and 1dd are on opposite ends.

Shown in dotted outline in FIG. 6 is the optical aperture 9, which is the part of the lens used for accurate optical scanning. In ordinary use, light might only be directed to the optical aperture 9, since that is the part of the lens to be used for focusing. In this embodiment, the optical aperture is generally centered in the lens, both laterally and in height, is 145 mm in the long direction and 5 mm in the height direction. The entire height of the lens, exclusive of the vapor barriers, is 14 mm.

Accordingly, in this embodiment the linear length of the optical aperture is almost 30 times the height of the optical aperture. Similarly, in this embodiment the height of the lens body is almost three times the height of the optical aperture. However, it is understood that lens body as little as 1.5 mm in the height dimension on each side of the optical aperture is effective, although preferably that dimension should be at least 2.5 mm on each side. Material near the outside of the mold exhibits optical distortion and is therefore unsuitable for use as part of the optical aperture.

FIG. 7 is a side view of FIG. 5 and FIG. 8 is also a side view with respect to FIG. 5, but sectioned in the center of the lens. They are generally to scale and therefore illustrate the overall dimensions. Surface 1a is shown as concave. Specifically, it may be a true toric. In other lenses it might be convex, and the variations in curvature along the length define the focusing of the lens. Similarly, surface 1b is shown concave and is typically toric or quasi toric. Although defining the surfaces of a lens is specialized and complex, with respect to this invention it may be standard and will not be further discussed.

Barrier layers 5a and 5b in this embodiment are 0.178 mm thick aluminum foil with acrylic adhesive on the surface which contacts the surfaces 3a and 3b respectively. The remainder of the lens as described, which are lens body 1, extensions 3a and 3b, end parts 1c and 1cc, location extension 3bb, and bumps 3d and 3dd are a single integral member formed of polymethyl methacrylate by simple injection molding or by injection molding with pressure assist, as is standard in the molding art. Barrier layers 5a and 5b are applied by simply bringing the adhesive side of the barrier into direct contact with the surfaces 3a and 3b respectively.

Figure 10:
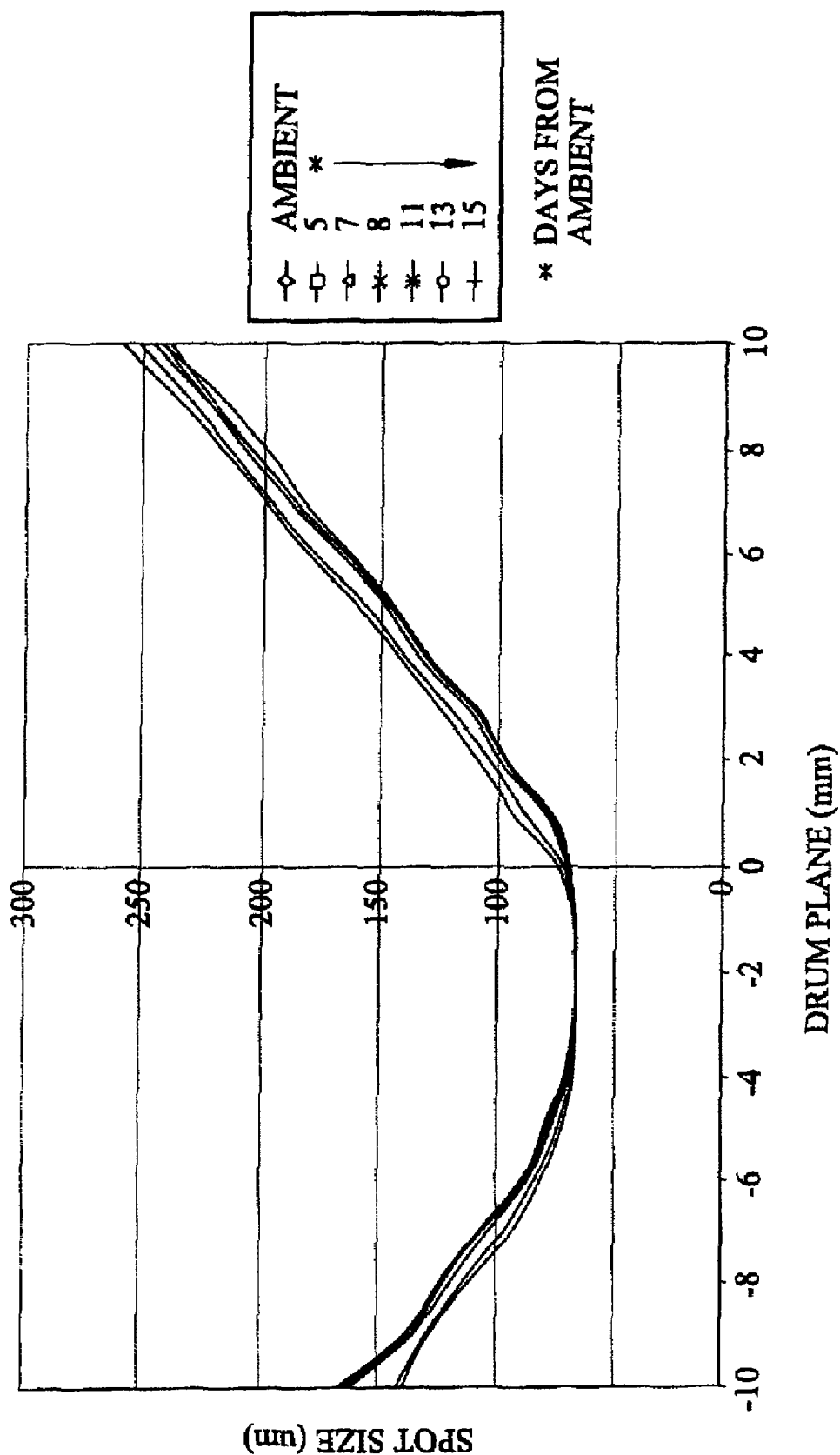
FIG. 10 is a plot of data from the same representation application as that of the FIG. 9 data with the vapor barrier of this invention.

A typical use for the lens of this invention is part of a light spot scanning system on a photoconductive surface, as illustrated in FIG. 10 of the foregoing U.S. Pat. No. 5,408,360. A small spot of light is moved across the clear aperture to apply a small spot of light sequentially across the photoconductive surface.

Lenses of this invention may be excellent f-theta lenses. Such lenses are well known in the art. They are used to direct a spot of light across a light sensitive surface with the light moving linearly with the angle (hence the reference to theta, a symbol commonly used for angle). Without the adjustment by the focusing of an f-theta lens, the line would move in accordance with the cosine of the angle.

Since the internal sides of surfaces 3a and 3b not over body 1 are not covered with a vapor barrier, the essential advantage is understood to result from the top and bottom of body 1 having a vapor barrier, coupled with the optical aperture being within body 1 and surrounded in the height dimension on both top and bottom by body having height of at least 1.5 mm. Similarly, where body 1 is thin in the optical transmission direction in certain lenses, the barrier layer may not be necessary over such locations as significant optical distortion is not normally realized where a lens becomes saturated across it full width in the optical transmission direction.

Alternative barrier layers can include any treatment or application, which is or becomes impervious to water. This would include paints and possibly surface treatments by oxidation.

Figure 9:
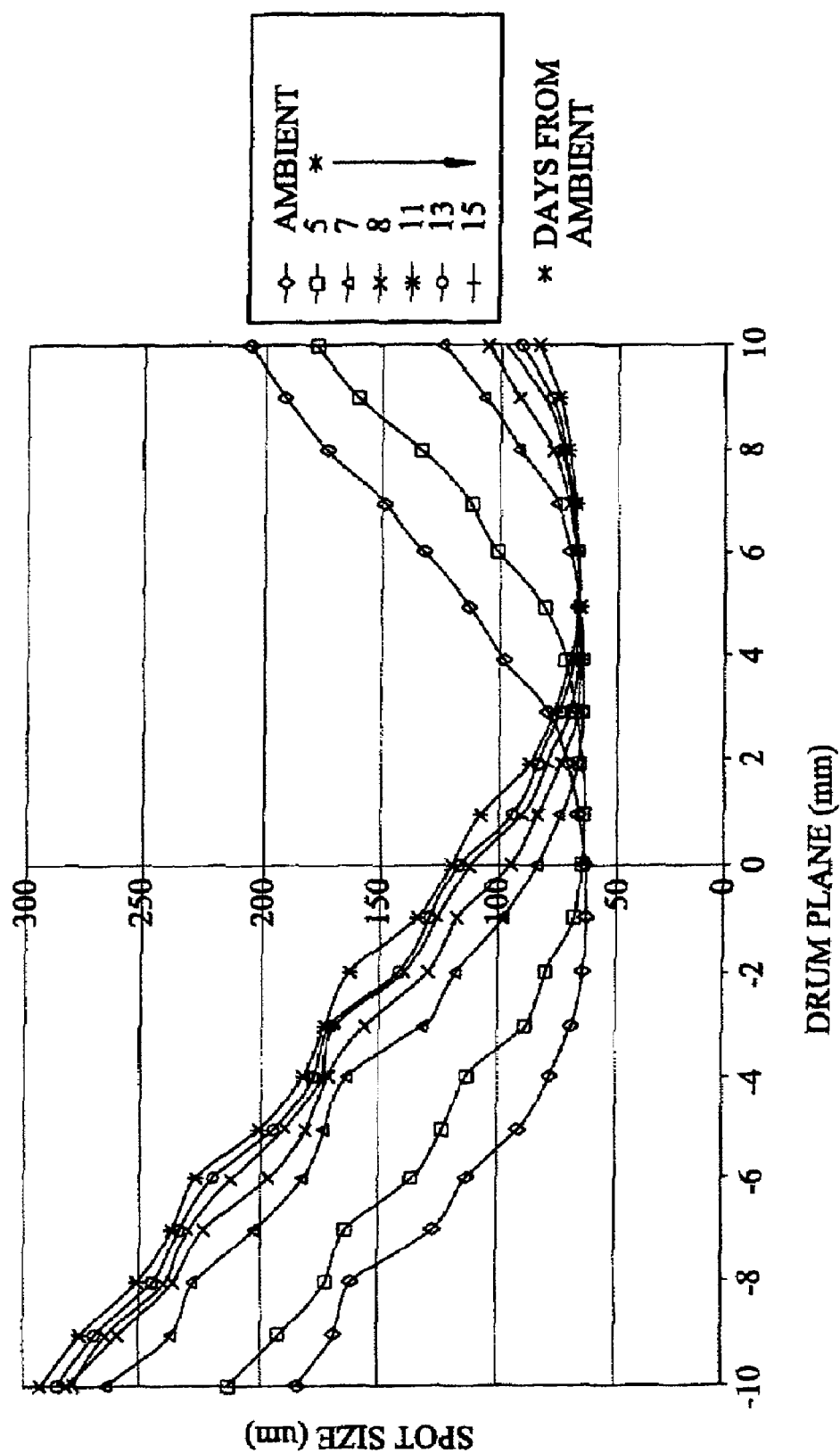
FIG. 9 is a plot of data from a representative application without the vapor barrier of this invention.

With respect to FIG. 9 and FIG. 10 data was obtained from an optical system employing this invention originally at ambient temperature and humidity and then subjected to 60 degrees C. and 90 percent relative humidity. The spot size was measured both at the location representative of the photoconductive drum where the spot was focused at the ambient conditions and at 1 mm equally spaced locations both plus and minus from that location. At ambient conditions the spot size measured becomes larger as the measurement point departs from the location representative of drum location.

At high humidity conditions the spot size at the photoconductor (drum plane 0) increased due to focal shift about 70 percent in size (about 70 um to about 120 um). This data resulted in curves shown in FIG. 9. As shown in FIG. 9, the day 13 and day 15 results of the 15 day test show and improvement, believed to be the result of the lens approaching saturation. Where a vapor barrier was used, the results varied very little over a similar 15-day test, as shown in FIG. 10, thus clearly showing the value of this invention. (the curves are so close together that they could not be meaningfully shown with their identifying symbol. The curves are very close together at the 0 drum plane.)

Accordingly, this invention is believed to have a wide applicability and variability in form, particularly with respect to how the vapor barriers are formed.

What is claimed is:

1. A humidity tolerant scan lens comprising:
    a optical body having a length substantially longer than its height and first and second extensions extending along its length and lying in a plane substantially parallel to the light transmitting direction of said optical body, a front curved portion defining an optical aperture whose dimensions are a portion of the optical body's length and height; and
    first and second barrier layers lying substantially coextensive along the lengths of said first and second extensions, the barrier layers being positioned on external sides and spaced from internal sides of the first and second extensions;
    wherein said first and second barrier layers increase the optical stability of light focused through said optical aperture with changes in humidity.

2. The lens of claim 1 wherein said first and second barrier layers comprise sheets of water imperious material.

3. The lens of claim 1 wherein said optical body has a curved radius.

4. The lens of claim 3 wherein the outer circular radius of said curved radius is 235 mm.

5. The lens of claim 4 wherein the inner circular radius of said curved radius is 382 mm.

6. The lens of claim 1 wherein the thickness of said optical body increases from middle to end.

7. The lens of claim 1 wherein the thickness of said body decreases from middle to end.

8. The lens of claim 1 wherein said optical aperture is substantially centered about said optical body.

9. The lens of claim 1 wherein the length of said optical aperture is approximately 30 times its height.

10. The lens of claim 9 wherein the height of said optical body is approximately 3 times the height of said optical aperture.

11. The lens of claim 1 wherein the height of said optical body on each side of said optical aperture ranges form 1.5 mm to 2.5 mm.

12. The lens of claim 1 wherein said optical body is concave.

13. The lens of claim 1 wherein said optical body is convex.

14. The lens of claim 1 wherein said barrier layers comprise aluminum foil with an acrylic adhesive.

15. The lens of claim 1 wherein said optical body is formed of polymethyl methacrylate.

16. A light spot scanning system utilizing a humidity tolerant scan lens according to claim 1.

* * * * *